United States Patent [19]

Schauder et al.

[11] Patent Number: 5,309,353
[45] Date of Patent: May 3, 1994

[54] MULTIPLE REFERENCE FRAME CONTROLLER FOR ACTIVE FILTERS AND POWER LINE CONDITIONERS

[75] Inventors: Colin D. Schauder, Murrysville Boro; Steven A. Moran, Mt. Lebanon, both of Pa.

[73] Assignee: Westinghouse Electric Corp., Pittsburgh, Pa.

[21] Appl. No.: 955,639

[22] Filed: Oct. 2, 1992

[51] Int. Cl.$^5$ ............................................. G05B 13/02
[52] U.S. Cl. ..................................... 364/148; 363/39; 364/176; 318/798
[58] Field of Search ............... 364/148, 152, 176, 483, 364/815, 731, 572, 825, 724.01; 363/39-43, 95-99; 323/205, 207; 318/798-811

[56] References Cited

U.S. PATENT DOCUMENTS

| | | | |
|---|---|---|---|
| 3,968,422 | 7/1976 | Waldmann | 323/207 |
| 4,456,868 | 6/1984 | Yamamura et al. | 318/800 |
| 4,651,265 | 3/1987 | Stacey et al. | 363/35 |
| 4,855,518 | 8/1989 | Schauder | 318/798 |
| 4,862,054 | 8/1989 | Schauder | 318/800 |
| 4,862,343 | 8/1989 | Nomura et al. | 363/41 |
| 4,962,339 | 10/1990 | Schauder | 318/798 |
| 5,063,532 | 11/1991 | Takeda et al. | 364/825 |
| 5,138,247 | 8/1992 | Tanoue et al. | 323/207 |

OTHER PUBLICATIONS

Komatsugi, K, Imura, T "Harmonic Current Compensator Composed of Static Power Converter" 1986 IEEE, 0275-9306/86/0000-0283, pp. 283-290.

Superti-Furga, G, Tironi, E "On Compensation Strategies for Active Filtering in Power Networks"; date unknown.

Akagi, H, Nabae, A "Control Strategy of Active Power Filters Using Multiple Voltage-Source PWM Converters" IEEE Transactions on Industry Applications, vol. IA-22, No. 3, May/Jun. 1986, 0093-9994/85/0500-0460, pp. 460-465.

Fujita, H, Akagi, H "A Practical Approach to Harmonic Compensation in Power Systems-Series Connection of Passive and Active Filters" IEEE Transactions on Industry Applications, vol. 27, No. 6, Nov./Dec. 1991, 0093-9994/91, pp. 1020-1025.

*Primary Examiner*—Joseph Ruggiero
*Attorney, Agent, or Firm*—R. P. Lenart

[57] ABSTRACT

An electrical control system includes multiple frames of reference in the error path of a controller. In each such frame, a particular chosen component of the error vector appears as a constant vector and is passed through a pure integrator thus acquiring infinite gain. In the steady state, the net error vector can then be forced to have zero content at each of the targeted frequencies (as set by the rotational velocity of the frames of reference). Both parallel and series configuration of the controller are provided, as well as the control methods used by the controllers.

7 Claims, 8 Drawing Sheets

PRIOR ART

MULTIPLE REFERENCE FRAME CONTROLLER FOR ACTIVE FILTERS AND POWER LINE CONDITIONERS

BACKGROUND OF THE INVENTION

This invention relates to electrical equipment used for conditioning electric power and, more particularly, to methods of controlling such equipment.

Active filters and power line conditioners utilize pulse width modulated (PWM) inverters with high frequency switching. In general, these applications require the inverter to supply harmonic and transient currents to a node on the power line with the objective of maintaining either a sinusoidal fundamental current on the line feeding the node, or a sinusoidal voltage at the point of connection, or both of these. Modern inverters can operate at quite high power levels with switching frequencies as high as 20 kHz. They are thus intrinsically capable of producing output currents of up to about the 40th harmonic of 60 Hz.

In the early development of these systems, the approach used was to establish closed loop control of the inverter currents with the highest possible bandwidth. Each event on the power line that caused the controlled quantity to deviate from the desired sine wave would then produce a corrective response from the controller. This is a reasonably effective approach, but it cannot completely eliminate any harmonics because of the limited dynamic response of the current controller. In the case where the current controlled loop is referenced by an outer voltage control loop, the ability of the voltage controller to reduce harmonics may be seriously limited.

Vector control techniques have been used in prior art motor control systems. In a vector control system, a controlled quantity (such as a three phase current in which the individual currents sum to zero) is represented by a single vector. That vector is then transformed onto a synchronously rotating frame of reference to produce a dc signal. The dc signal can then be integrated and subjected to an inverse transformation to produce an output signal which is used as a control signal to adjust the controlled quantity.

While prior art rotating frame controllers are very effective at tracking a single balanced set of three phase sine waves with zero error, they typically behave poorly in response to additional components of different frequency or phase sequence, due to system non-linearities. This invention seeks to apply a rotating frame control technique to systems such as active filters and power controllers which are subject to harmonic interference on the controlled power line.

SUMMARY OF THE INVENTION

This invention uses multiple frames of reference in the error path of a controller. In each such frame, a particular chosen component of the error vector appears as a constant vector and is passed through a pure integrator thus acquiring infinite gain. In the steady state, the net error vector can then be forced to have zero content at each of the targeted frequencies (as set by the rotational velocity of the frames of reference).

Control circuits constructed in accordance with this invention include a reference frame controller implemented in either a parallel or a series configuration. If a parallel implementation is used the control circuit comprises: means for producing an error signal vector in a fixed reference frame, with the error signal vector being representative of the difference between an output signal and a reference signal; a plurality of rotating frame controllers connected to receive the error signal vector, each of the rotating reference frame controllers including means for transforming the error signal vector onto a rotating frame of reference to produce an intermediate signal, means for integrating the intermediate signal to produce an integrated signal, and means for transforming the integrated signal onto the fixed frame of reference to produce a transformed integrated signal. The transformed integrated signals from each of the rotating frame controllers are combined to produce a control signal for use in controlling the output signal.

In the series implementation, the control circuit comprises: means for producing an error signal vector in a fixed reference frame, with the error signal vector being representative of the difference between an output signal and a reference signal; a plurality of series connected rotating frame controllers, each connected to receive at least a preselected component of the error signal vector, with each of the rotating reference frame controllers including means for transforming the preselected component of the error signal vector onto a rotating frame of reference to produce an intermediate signal, means for integrating the intermediate signal to produce an integrated signal, means for producing a signal representative of the error signal, and means for combining the integrated signal and the signal representative of the error signal to produce an output signal. The output signal of a preceding one of the rotating reference frame controllers serving as the input signal for a successive one of the rotating reference frame controllers. The output signal from the last one of the series connected rotating reference frame controllers is transformed onto the fixed frame of reference to produce a control signal.

This invention also encompasses the method of producing a control signal for controlling an output signal performed by both the parallel and series implementation of the circuits discussed above.

This invention makes it possible to eliminate selected steady state harmonics (voltage or current) in an active filter or power line conditioner using a pulse width modulated inverter, without the need for high bandwidth control loops.

BRIEF DESCRIPTION OF THE DRAWING

The invention will be more readily apparent to those skilled in the art by reference to the accompanying drawings wherein.

DESCRIPTION OF THE PREFERRED EMBODIMENTS

It has been observed that the vast majority of distortions in multiple phase power line voltage are not transient phenomena, but rather periodic events comprising harmonics of the fundamental with positive or negative phase sequence. Once the magnitude and phase of these harmonics has been determined, they are fully defined until a change occurs. Therefore under steady state conditions, it is possible to set up an inverter, in an active filter or power line conditioner, to produce exactly the required harmonic currents without the need for a high-bandwidth controller. This is true irrespective of whether the controlled quantity is line current or voltage at the point of connection. Of course, a respectable control bandwidth may also be desirable to deal with any transient phenomena.

Figure 1:
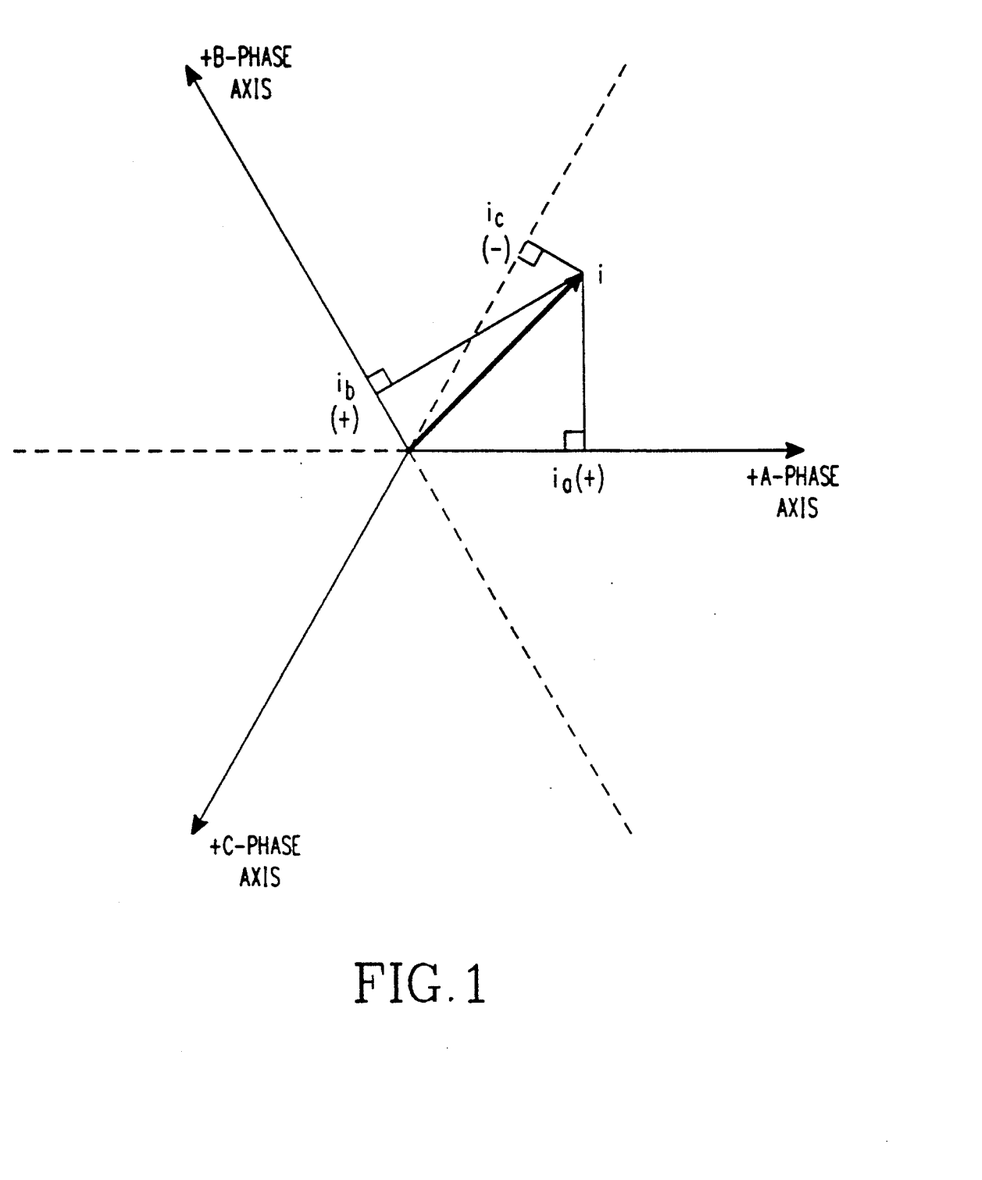
FIG. 1 is a vector representation of the instantaneous phase variables used in this invention.
Figure 2:
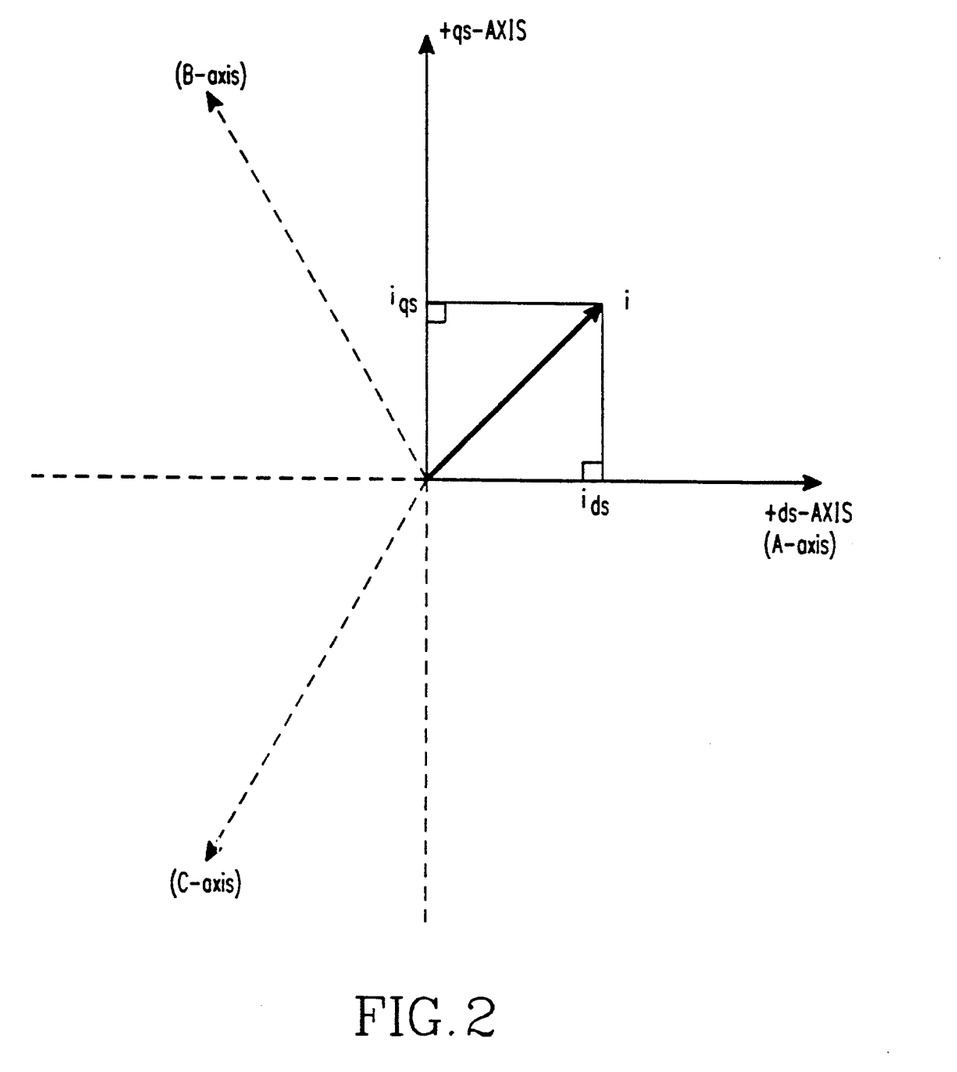
FIG. 2 shows the vector of FIG. 1 in cartesian coordinates.

In the field of motor drive systems, vector control of the three phase currents in a synchronously rotating reference frame is an established technique. It is used to produce a desired set of alternating currents with zero fundamental error in the steady state. The theory of instantaneous symmetrical components gives a convenient representation of three instantaneous quantities that sum to zero, such as for example, the voltages or currents of a balanced three phase system. The three variables are instantaneously represented by a two dimensional vector whose vertical projections onto three symmetrically disposed axes have the same magnitude as the variables. This is illustrated graphically in FIG. 1 wherein the vector $\hat{i}$ is defined by its phase components $i_a$, $i_b$ and $i_c$. As shown in FIG. 2, the vector $\hat{i}$ can be represented by a complex number whose real and imaginary parts, $i_{ds}$ and $i_{qs}$, correspond to the (ds, qs) coordinates. In this case, $$\hat{i} = (i_{ds} + ji_{qs}) \quad (1)$$

For a case where vector i represents a balanced three phase sinusoidal set, it has a constant magnitude and rotates in the complex plane with an angular frequency equal to the frequency of the set. Since $i_a + i_b + i_c = 0$, $i_{ds}$ and $i_{qs}$ can be defined in terms of $i_a$ and $i_c$ as follows:

$$\begin{bmatrix} i_{ds} \\ i_{qs} \end{bmatrix} = \begin{bmatrix} 1 & 0 \\ \frac{-1}{\sqrt{3}} & \frac{-2}{\sqrt{3}} \end{bmatrix} \begin{bmatrix} i_a \\ i_c \end{bmatrix} \quad (2)$$

Alternatively, for the balanced three phase sinusoidal set, $\hat{i}$ can be represented as:

$$\hat{i} = i_0 e^{j\omega t} \quad (3)$$

where $i_0$ is a complex constant.

Figure 3:
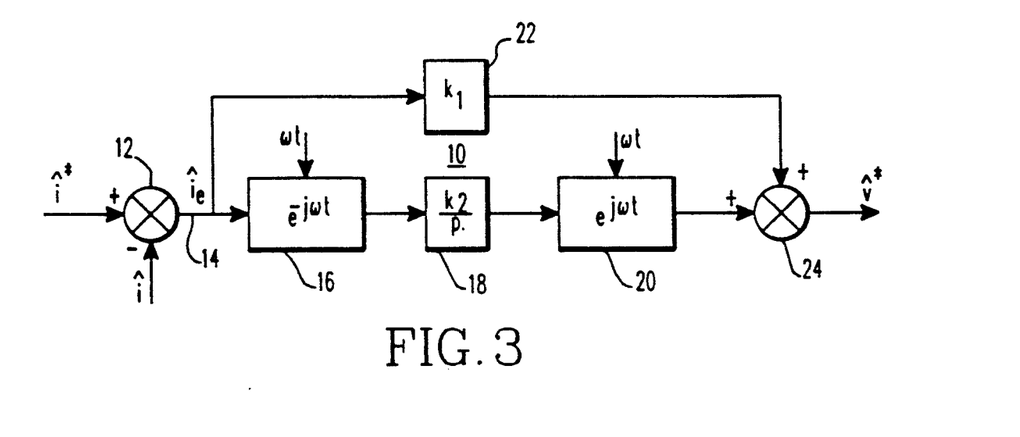
FIG. 3 is a block diagram of a vector control with a synchronously rotating frame of reference.

FIG. 3 illustrates the notion of a rotating reference frame controller 10 in terms of this vectorial notation. A desired vector $\hat{i}^*$ is compared in summing point 12 with the measured actual vector $\hat{i}$ to produce an error vector $\hat{i}_e$ on line 14. Block 16 shows that this quantity is multiplied by $e^{-j\omega t}$ which corresponds to a rotation of the coordinate axes through the angle $\omega t$. In this reference frame a component of the error vector with frequency $\omega$, such as that described in equation (3), becomes a constant $i_0$. The error signal is then passed through a pure integrator 18 which has infinite gain for this component. A further multiplication by $e^{j\omega t}$ in block 20 returns the signal to the stationary ds-qs coordinate system. In practice, the output of this process is usually combined with a term proportional to the error vector (produced by the amplifier as illustrated by block 22) in combination with summation point 24, and the net transfer function of the controller is then:

$$\frac{V^*}{I_e} \frac{(s)}{(s)} k_1 + \frac{k_2}{(s - j\omega)} \quad (4)$$

The important feature of this type of controller is that it provides a vector pole for vector components of rotational angular frequency $+\omega$. The output of the controller may then be used to reference a three phase power amplifier such as an inverter, or to provide a reference to an inner control loop. In the steady state, it will then ensure that the $+\omega$ component of the error vector is reduced to zero.

Figure 4:
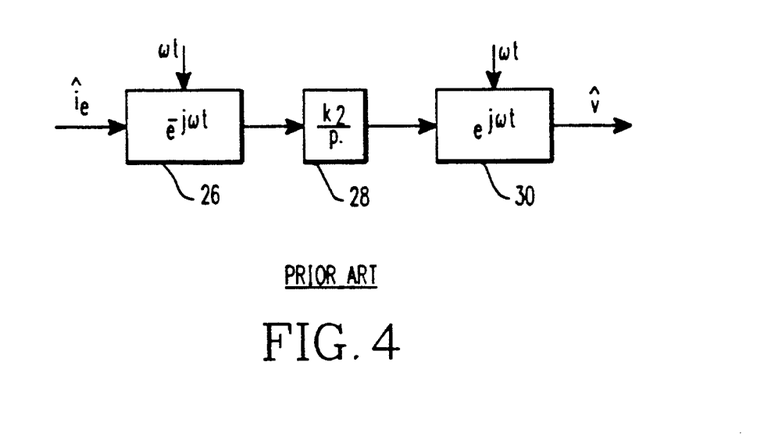
FIG. 4 is a block diagram of a rotating frame of reference as used in prior art motor control circuits.
Figure 5:
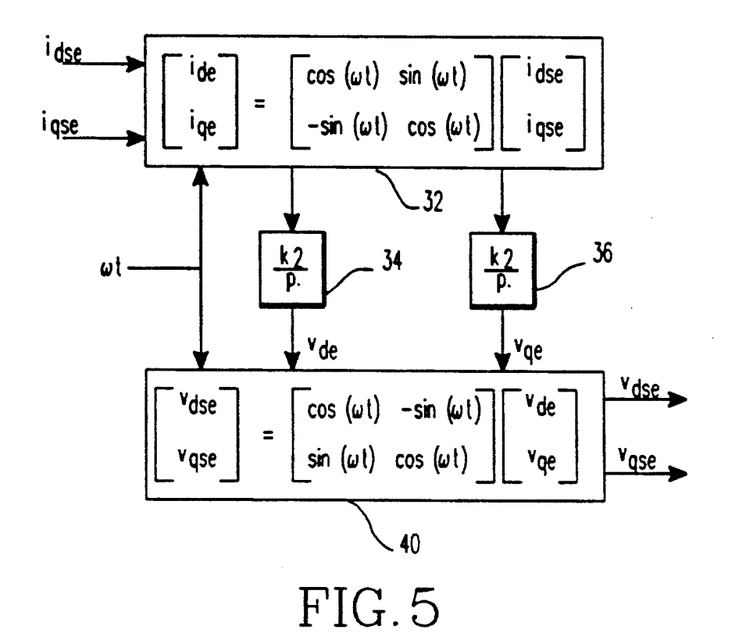
FIGS. 5 and 6 are alternative implementations of the vector control of FIG. 4.
Figure 6:
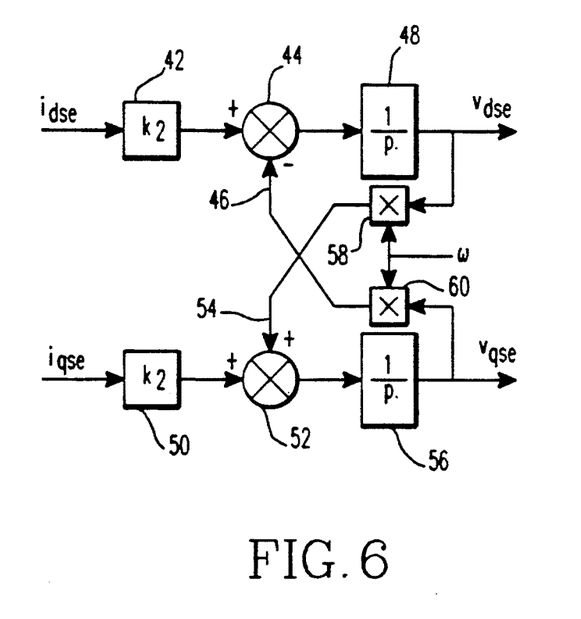

FIG. 4 is a block diagram of a basic rotating frame controller as used in prior art motor control circuits An error vector signal $\hat{i}_e$ is used to produce a voltage control signal $v^*$ by multiplying $\hat{i}_e$ by $e^{-j\omega t}$ as shown in block 26, integrating the result as shown in block 28 and multiplying the output of the integrator by $e^{j\omega t}$ as shown in block 30. FIGS. 5 and 6 show alternative implementations of the controller of FIG. 4. In each case the direct and quadrature components of the error vector ($i_{dse}$ and $i_{qse}$) are used to produce direct and quadrature voltage control signal components $V_{dse}$ and $V_{qse}$.

In FIG. 5, the direct and quadrature components of the error signal are transformed onto a rotating reference frame using the equations shown in block 32. The resultant signals, $i_{de}$ and $i_{qe}$, include a constant component at the frequency defined by the rotational velocity of the rotating reference frame. These signals are integrated by integrators 34 and 36 to produce integrated signals $v_{de}$ and $v_{qe}$, which are transformed using the equations in block 40, back to the original frame of reference, where they appear as output signals $V_{dse}$ and $V_{qse}$.

In FIG. 6, the direct component, $i_{dse}$, of the error signal vector is amplified as illustrated by block 42, and combined in summation point 44 with a feedback signal on line 46. The resulting signal is integrated as shown in block 48 to produce the output signal $V_{dse}$. Similarly, the quadrature component, $i_{qse}$, of the error signal vector is amplified as illustrated by block 50, and combined in summation point 52 with a feedback signal on line 54. The resulting signal is integrated as shown in block 56 to produce the output signal $V_{qse}$. Multipliers 58 and 60 combine the output signals with a frequency signal $\omega$ to produce the feedback signals as shown.

Figure 7:
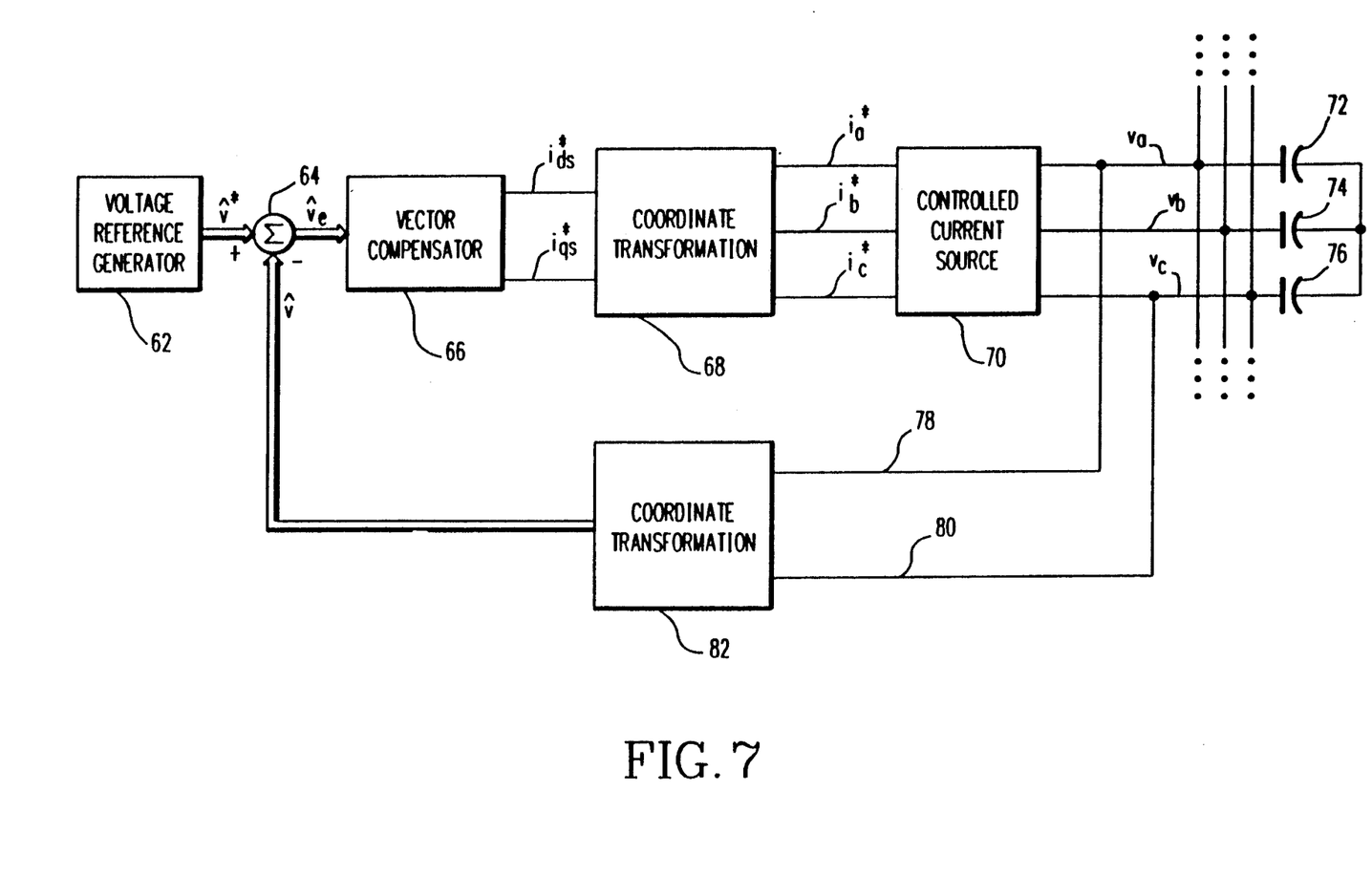
FIG. 7 is a block diagram of a current control circuit incorporating the present invention.

FIG. 7 is a block diagram of a voltage control system constructed in accordance with this invention. A voltage reference generator 62 produces a voltage reference vector v in a first frame of reference. The voltage reference vector is combined with a feedback vector $\hat{v}$ in summation point 64 to produce an error vector $\hat{v}_e$. As discussed in detail below, preselected components of the error vector are transformed onto multiple rotating frames of reference by vector compensator 66 to produce direct and quadrature current reference signals $i_{ds}^*$ and $i_{qs}^*$. These signals are subjected to a coordinate transformation in block 68 to produce phase current reference signals $i_a^*$, $i_b^*$ and $i_c^*$. A controlled current source 70 uses these phase current reference signals to control the output current to a load, which in this example is represented by capacitors 72, 74 and 76 connected across a three phase power line. Voltages $v_a$ and $v_c$ are detected on lines 78 and 80, and subjected to a coordinate transformation in block 82 to produce the feedback vector $\hat{v}$.

Figure 8:
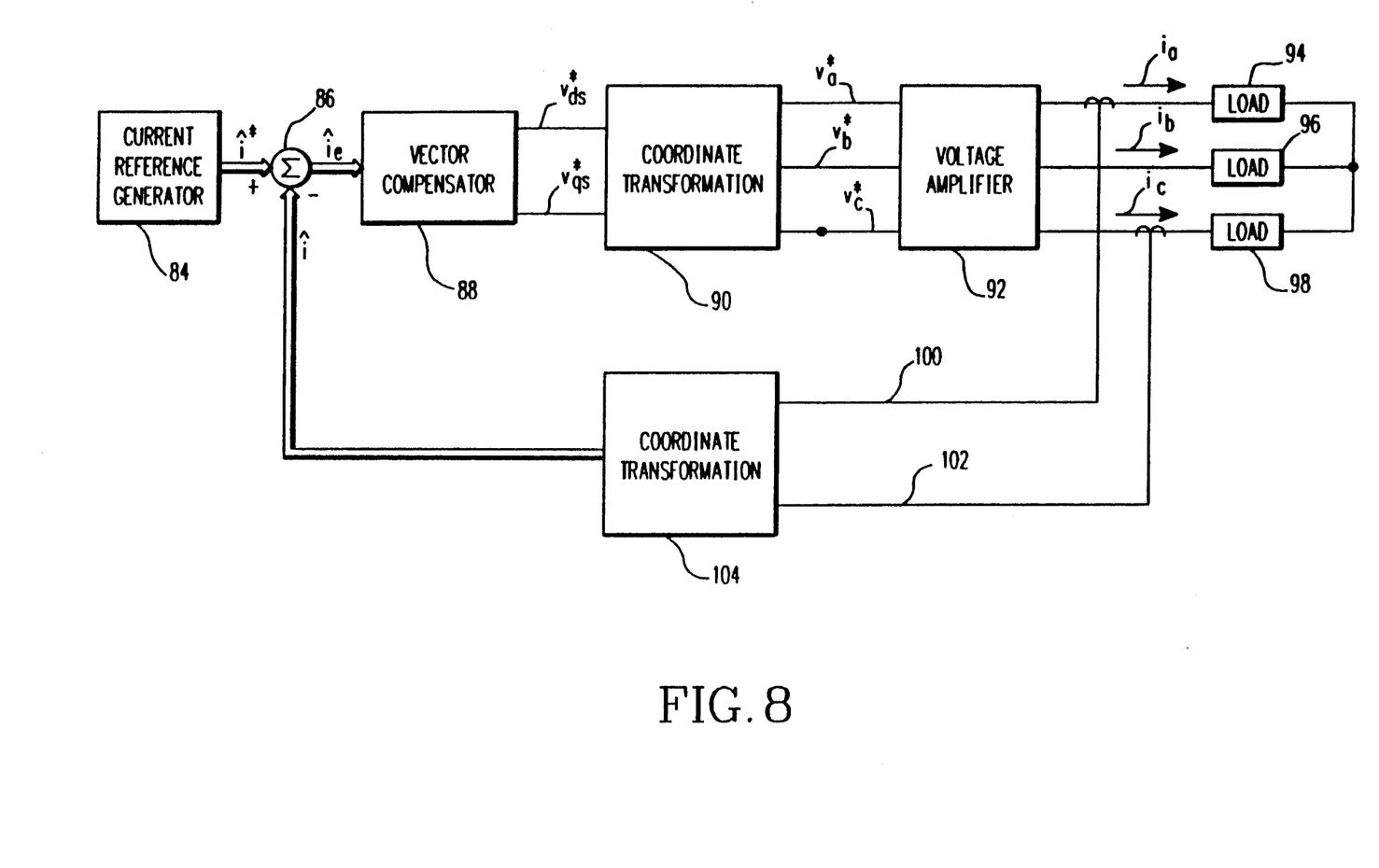
FIG. 8 is a block diagram of a voltage control circuit incorporating the present invention.

FIG. 8 is a block diagram of a current control system constructed in accordance with this invention. A current reference generator 84 produces a current reference vector $i^*$ in a first frame of reference. The current reference vector is combined with a feedback vector $\hat{i}$ in summation point 86 to produce an error vector $\hat{i}_e$. As discussed in detail below, preselected components of the error vector are transformed onto multiple rotating frames of reference by vector compensator 88 to produce direct and quadrature current reference signals $v_{ds}^*$ and $v_{qs}^*$. These signals are subjected to a coordinate transformation in block 90 to produce phase voltage reference signals $v_a^*$, $v_b^*$ and $v_c^*$. A controlled voltage source 92 uses these phase voltage reference signals to control the output current to a load, which in this example is represented by blocks 94, 96 and 98. Currents $i_a$ and $i_c$ are detected on lines 100 and 102, and subjected to a coordinate transformation in block 104 to produce the feedback vector $\hat{i}$.

Figure 9:
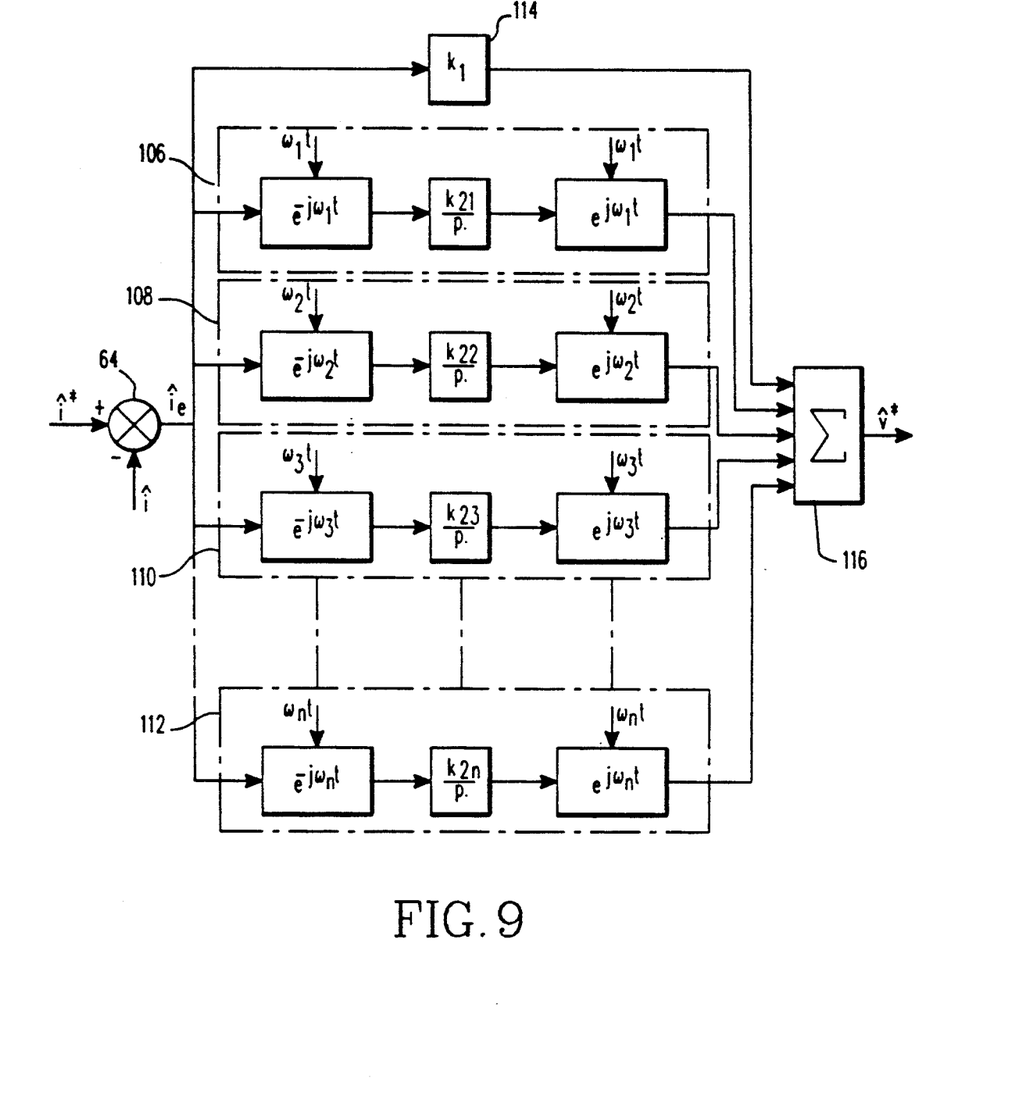
FIG. 9 is a block diagram of a parallel implementation of a multiple reference frame controller constructed in accordance with this invention.

FIG. 9 shows a parallel path implementation of the invention for targeted frequencies of $\omega_1, \omega_2, \omega_3, \ldots, \omega_n$. An error vector $\hat{i}_e$ is supplied to a plurality of rotating frame controllers 106, 108, 110 and 112. Each of the rotating frame controllers includes a means for transforming the error vector onto a rotating reference frame, an integrator, and a means for transforming the output of the integrator back to the original frame of reference.

Different target frequencies $\omega_n$ are used in each rotating frame controller. These target frequencies may be, for example, harmonic frequencies on a power line which is being controlled by an active filter or a power line conditioner. An amplifier 114 is used to produce a signal representative of the error signal. The resulting signal is combined with the outputs of the rotating frame controller in summation point 116 to produce a voltage reference vector $v^*$. The transfer function of the circuit illustrated by FIG. 9 is:

$$\frac{\hat{V}^*(s)}{\hat{I}_e(s)} = \qquad (5)$$

$$k_1 + \frac{k_{21}}{(s - j\omega_1)} + \frac{k_{22}}{(s - j\omega_2)} + \frac{k_{23}}{(s - j\omega_3)} + \frac{k_{2n}}{(s - j\omega_n)}$$

Figure 10:
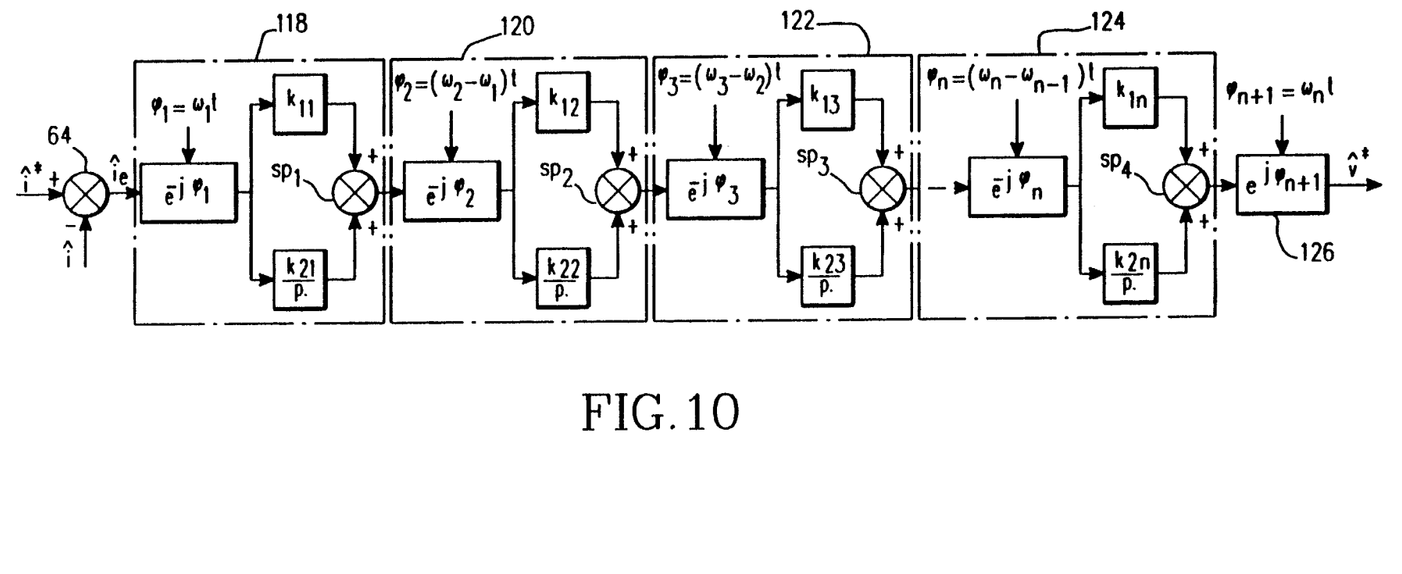
FIG. 10 is a block diagram of a series implementation of a multiple reference frame controller constructed in accordance with this invention.

FIG. 10 shows a series path implementation of the invention for targeted frequencies of $\omega_1, \omega_2, \omega_3, \ldots, \omega_n$. An error vector $\hat{i}_e$ is supplied to a first one of a plurality of series connected rotating frame controllers 118, 120, 122 and 124. Each of the rotating frame controllers includes a means for transforming the error vector onto a rotating reference frame, an integrator, and a means producing a signal representative of the transformed error vector. The integrator output and the signal representative of the transformed error vector are combined in summation point $sp_n$. Different target frequencies $\omega_n$ are used in each rotating frame controller. These target frequencies may be, for example, harmonic frequencies on a power line which is being controlled by an active filter or a power line conditioner. The output of the last rotating frame controller is transformed in block 124 back to the original frame of reference to produce a voltage reference vector $\hat{v}^*$. The transfer function of the circuit illustrated by FIG. 10 is:

$$\frac{\hat{V}^*(s)}{\hat{I}_e(s)} = \left[k_{11} + \frac{k_{21}}{(s - j\omega_1)}\right]\left[k_{12} + \frac{k_{22}}{(s - j\omega_2)}\right]\left[k_{13} + \frac{k_{33}}{(s - j\omega_3)}\right]\left[k_{1n} + \frac{k_{2n}}{(s - j\omega_n)}\right] \qquad (6)$$

Both implementations shown in FIGS. 9 and 10 provide n complex poles at the chosen frequencies, with n associated complex zeros located adjacent in the left half of the complex plane. Either of the techniques illustrated in FIGS. 5 or 6 can be used to implement the rotating frame transformations in the multiple frame controller.

Note that a targeted frequency may be either positive or negative. A positive value corresponds to a positive sequence three phase set and a negative value corresponds to a negative sequence set. If a positive frequency is targeted alone, then the corresponding negative sequence error set at the same frequency will not necessary be eliminated.

The multiple frame controller of this invention is based on the vector representation of three phase quantities arising from the theory of instantaneous symmetrical components. It is thus not applicable to single phase systems since these systems have no useful space vector interpretation.

This invention also encompasses a method of controlling active filters comprising the steps of: producing a first vector signal representative of an output signal to be controlled, with the first vector signal being referenced to a stationary coordinate system; comparing the first vector signal with a reference vector signal to produce an error vector signal; transforming the error vector signal onto a plurality of rotating frames of reference to produce a plurality of intermediate signals; integrating each of the intermediate signals to produce a plurality of integrated signals; transforming each of the integrated signals onto the first set of coordinates to form a set of transformed integrated signals; and combining the transformed integrated signals to produce a control signal for controlling the output signal.

Although the present invention has been described in terms of its preferred embodiments, it will be apparent to those skilled in the art that various changes may be made without departing from the scope of the invention, which is defined by the following claims.

We claim:

1. A control circuit comprising:
   means for producing an error signal vector in a fixed reference frame, said error signal vector being representative of the difference between an output signal and a reference signal;
   a plurality of rotating frame controllers connected to receive said error signal vector, each of said rotating reference frame controllers including means for transforming said error signal vector onto a rotating frame of reference to produce an intermediate signal, means for integrating said intermediate signal to produce an integrated signal, and means for transforming said integrated signal onto said fixed frame of reference to produce a transformed integrated signal; and means for combining said transformed integrated signal from each of said rotating frame controllers to produce a control signal for use in controlling said output signal.

2. A control circuit according to claim 1, further comprising:

means for producing a signal representative of said error signal; and wherein said means for combining said transformed integrated signals also combines said signal representative of said error signal with said transformed integrated signals.

3. A control circuit comprising:

means for producing an error signal vector in a fixed reference frame, said error signal vector being representative of the difference between a controlled signal and a reference signal;

a plurality of series connected rotating frame controllers, each connected to receive at least a preselected component of said error signal vector, each of said rotating reference frame controllers including means for transforming said preselected component of said error signal vector onto a rotating frame of reference to produce an intermediate signal, means for integrating said intermediate signal to produce an integrated signal, means for producing a signal representative of said error signal, and means for combining said integrated signal and said signal representative of said error signal to produce an output signal, said output signal of a preceding one of said rotating reference frame controllers serving as said error signal for a successive one of said rotating reference frame controllers; and means for transforming said output signal from a last one of said series connected rotating reference frame controllers onto said fixed frame of reference to produce a control signal.

4. A method of producing a control signal for controlling an output signal, said method comprising the steps of:

producing a first vector signal representative of a signal to be controlled, said first vector signal being referenced to a stationary coordinate system;

comparing said first vector signal with a reference vector signal to produce an error vector signal;

transforming said error vector signal onto a plurality of rotating frames of reference to produce a plurality of intermediate signals;

integrating each of said intermediate signals to produce a plurality of integrated signals;

transforming each of said integrated signals onto said first set of coordinates to form a set of transformed integrated signals; and combining said transformed integrated signals to produce a control signal for controlling said output signal.

5. A method of producing a control signal for controlling an output signal, according to claim 4, said method further comprising the step of:

producing a signal representative of said error vector signal; and wherein said combining step combines said transformed integrated signals with said signal representative of said error vector signal.

6. A method of producing a control signal for controlling an output signal, said method comprising the steps of:

producing a first vector signal representative of a signal to be controlled, said first vector signal being referenced to a stationary coordinate system;

comparing said first vector signal with a reference vector signal to produce an error vector;

transforming said error vector signal onto a first rotating frame of reference to produce a first intermediate signal;

integrating said first intermediate signal to produce a first integrated signal;

producing a first signal representative of said first intermediate signal;

combining said first integrated signal with said signal representative of said first intermediate signal to produce a second error signal;

transforming said second error vector onto a second rotating frame of reference to produce a second intermediate signal;

integrating said second intermediate signal to produce a second integrated signal;

producing a signal representative of said second intermediate signal;

combining said second integrated signal with said signal representative of said second intermediate signal to produce a third error signal;

transforming said third error signal onto said first set of coordinates to produce a control signal for controlling said output signal.

7. A control circuit comprising:

means for producing an error signal vector in a fixed reference frame, said error signal vector being representative of the difference between a signal to be controlled and a reference signal;

a first circuit stage including means for transforming said error signal vector onto a first rotating frame of reference to produce a first intermediate signal, means for integrating said first intermediate signal to produce a first integrated signal, means for producing a signal representative of said error signal, and means for combining said first integrated signal and said signal representative of said error signal to produce a first compensated signal;

a second circuit stage including means for transforming said first compensated signal onto a second rotating frame of reference to produce a second intermediate signal, means for integrating said second intermediate signal to produce a second integrated signal, means for producing a signal representative of said first compensated signal, and means for combining said second integrated signal and said signal representative of said first compensated signal to produce a second compensated signal;

means for transforming said second compensated signal onto said fixed frame of reference to produce a control signal for controlling said controlled signal.

* * * * *